3,092,588
METHOD OF PRODUCING A PERMANENTLY ACTIVE CATALYST UTILIZING NEUTRON IRRADIATION
Arthur L. Jones, Lyndhurst, Harold A. Strecker, Bedford, and Richard F. Firestone, Cleveland, Ohio, assignors to The Standard Oil Company, Cleveland, Ohio, a corportion of Ohio
No Drawing. Filed Jan. 8, 1957, Ser. No. 632,958
2 Claims. (Cl. 252—432)

This invention relates to a method of making a catalyst having enhanced and permanent catalytic activity utilizing thermal neutron irradiation to force the elements of the catalyst into such close association as will result in catalytic activity.

It is believed that catalytic activity of solids results when an element having a different valence from the cation of the element forming the parent lattice is associated therewith. This produces electronic abnormalities, which results in sites or centers of catalytic activity. For instance, alumina in a silica lattice imparts catalytic activity when the silica or alumina itself has no activity in hydrocarbon cracking.

Many chemical methods have been proposed for forming two or more elements or compounds in such intimate association as to be catalytically active. Coprecipitation of a plurality of oxides or impregnation of one compound with another are the more common techniques. Many elements, however, for chemical reasons do not lend themselves to satisfactory coprecipitation or impregnation; or if they do, the elements are not so intimately formed in the lattice structure as to produce the requisite number of sites or centers to provide the catalytic activity.

In accordance with our invention, it is proposed to introduce any desired type of atom into the atomic lattice of different solids. This utilizes thermal neutron irradiation acting on elements of relatively large neutron capture cross-section. The atomic displacements resulting from the neutron absorption of such elements through its recoil knocks the atoms into close proximity and into the adjacent lattice of other elements.

Elements which have high nuclear cross-section include boron with a cross-section of 750 barns, cadmium with a cross-section of 2400 barns, and gadolinium with a cross-section of 44,000 barns. Small amounts of compounds of these elements may be included in the solid containing the oxides or other elements or compounds of which the catalyst is to be formed, and the catalyst is then subjected to the irradiation of thermal neutrons. Boron is decomposed to give products of high kinetic energy which, in effect, drive one of the elements or compounds into the lattice of the other.

An advantage of our process is the fact that the catalytic activity is permanent. Once the crystal lattice structure has been developed, it retains this structure and consequent catalytic activity. The catalyst does not depend for its activity upon any form of atomic energy inherent in it, but rather upon the peculiar crystal lattice structure which has been developed as a result of its having been exposed to thermal neutron irradiation in the presence of an element having a high neutron capture cross-section.

The thermal neutrons can be derived from a nuclear reactor preferably operating so that the sample is subjected to an integrated flux of at least $10^{10}$ nvt, which may be defined as $$\frac{\text{neutrons}}{\text{cm.}^3} \times \frac{\text{cm.}}{\text{sec.}} \times \text{sec.}$$

Thermal neutrons, their properties and methods of obtaining them are well known in the art, such as described in Principles of Nuclear Reactor Engineering, by Samuel Glasstone, published by D. Van Nostrand Company, Inc. (1955). In general, it may be said that they are fast neutrons that have been slowed down by a moderator so that they possess kinetic energies of about 0.02 to 1 electron volt.

The following is the best mode contemplated for carrying out our invention.

A silica gel is prepared by adding 0.1 N hydrochloric acid to a solution of sodium silicate with agitation to form a gelatinous precipitate. The proportions and conditions are not critical in the preparation as such gels are well known in the art. The gel is washed and dried. The dried gel is then impregnated with a solution of aluminum acetate and boric acid in an amount to provide one atom of aluminum for each five atoms of silica and 0.1% boron based on the silica-aluminum combination. The impregnated gel is then dried and subjected to thermal neutrons having a flux of $10^{16}$ nvt for $6 \times 10^5$ seconds. The gel is then leached with water to remove aluminum acetate not driven into the lattice. The catalyst is dried and heated at 1000° F. for 10 hours. It is then ready for use and may be employed in cracking gas oil to yield gasoline and lighter hydrocarbons.

As an alternative, the dried gel may be impregnated with aluminum triphenyl and boron hydride in solution in pentane in amounts to provide the same relative proportions. The process used is the same as that described above except that pentane is used in the leaching step.

As another example, a solution of chromium acetate has added to it slowly a solution of ammonium hydroxide to form a chromium hydroxide gel. This gel is filtered, washed, and dried. It is then impregnated with titanium acetyl acetonate and methyl borane in solution in benzene. The amount of the titanium compound is such as to provide one atom of titanium per nine atoms of chromium, and the amount of the methyl borane is to provide 0.1% boron on the chromium-titanium mixture. The catalyst is subjected to thermal neutrons having a flux as described above, leached with benzene, and otherwise processed as previously described. The catalyst may be used in hexene isomerization at relatively low temperatures, i.e., 500° F., and for polymerization of olefins.

As a further example, 100 g. of commercial pelleted alumina in cylinders ⅛ inch long by ⅛ inch diameter is impregnated with a solution prepared by mixing 0.73 g. of germanium tetrachloride with 19.9 g. of an aqueous solution containing 1.99 g. of chloroplatinic acid to which has been added sufficient concentrated hydrochloric acid to solubilize the germanium salt and bring the total volume up to 40 cc. The pelleted alumina absorbs all of the liquid, and the damp catalyst is then heated in air at 250° F. for 12 hours and then in an atmosphere of hydrogen at 1000° F. for 10 hours to reduce the platinum and germanium compounds to their metallic state. The catalyst is then dried and impregnated with one-half gram boric acid dissolved in 20 cc. water. The catalyst absorbs all of the solution and is dried at 212° F. for 10 hours. It is then irradiated, being subjected to the action of thermal neutrons having an integrated flux of $10^{20}$ nvt for 24 hours. The catalyst may be used for hydroisomerizing pentane, hexane, and heptane, and for dehydrogenation of cycloparaffins.

Following the same general procedure, the following catalysts may be prepared as indicated in the table below.

| Lattice Species | Second Element of Catalyst | Driving Element | Reaction Catalyzed |
|---|---|---|---|
| $Al_2O_3$ | 0.5% Pt+0.5% Re | 0.1% B | Hydroisomerization. |
| $MoO_3$ | 10% Nb | 0.1% Gd | Benzene Hydrogenation. |
| $SiO_2$ | 5% Pt | 0.25% B | Ammonia Oxidation. |
| $GeO_2$ | 10% Ga | 0.15% B | Methylcyclopentane Isomerization. |
| BeO | 10% $B_2O_3$ | same | n-heptane cyclization and Cetane Cracking. |
| $In_2O_3$ | 20% CdO | same | Cetane Cracking. |
| LiH | 10% Be | 0.1% B | Hexene Isomerization. |
| $Al_2O_3$ | 18% MgO | 0.5% B | Cetane Cracking. |
| $Fe_3O_4$ | 10% K($K_2O$) | 0.1% B | Ammonia Synthesis. |
| $Co_3O_4$ | 10% Th | 0.25% B | Fischer-Tropsch Synthesis. |
| $Ag_2O$ | 10% Ba | 0.25% B | Epoxidation of Olefins. |
| $CeO_2$ | 10% Os | 0.1% Gd | Hydroxylation of Olefins. |

If the products after being subjected to the thermal neutrons are radio-active, it may be necessary to defer their use until the activity has decayed to a safe extent or to provide suitable shielding during the use of the catalyst.

It will be obvious to one skilled in the art that our invention includes other variations, and these are intended to be included within the invention if embraced within the following claims.

We claim:
1. A method of making a catalyst which comprises forming a mixture of (1) silica, (2) an aluminum-containing compound, and (3) a boron-containing compound, and subjecting said mixture to the action of thermal neutrons of an intensity and for a time to change the boron by the nuclear capture of said neutrons and to drive the aluminum into the lattice of the silica by the kinetic impact resulting from said neutron capture and produce a solid having catalytic properties.

2. A method of making a catalyst which comprises forming a mixture of (1) silica, (2) an aluminum-containing compound selected from the group consisting of aluminum acetate and aluminum triphenyl, and (3) a boron-containing compound selected from the group consisting of boric acid and boron hydride, and subjecting said mixture to the action of thermal neutrons of an intensity and for a time to change the boron by the nuclear capture of said neutrons and to drive the aluminum into the lattice of the silica by the kinetic impact resulting from said neutron capture and produce a solid having catalytic properties.

References Cited in the file of this patent
UNITED STATES PATENTS

| 2,407,914 | Bailey | Sept. 17, 1946 |
| 2,446,619 | Stewart | Aug. 10, 1948 |

FOREIGN PATENTS

| 309,001 | Great Britain | Apr. 2, 1929 |

OTHER REFERENCES

J.A.C.S., 79, #1, pages 252 and 253, January 5, 1957.
"Nature," vol. 136, p. 1026, December 28, 1935.